June 29, 1926.
A. D. WILLSON
1,590,789
ACTUATING VALVE FOR VEHICLE SIGNALS
Filed Nov. 22, 1924   2 Sheets-Sheet 1
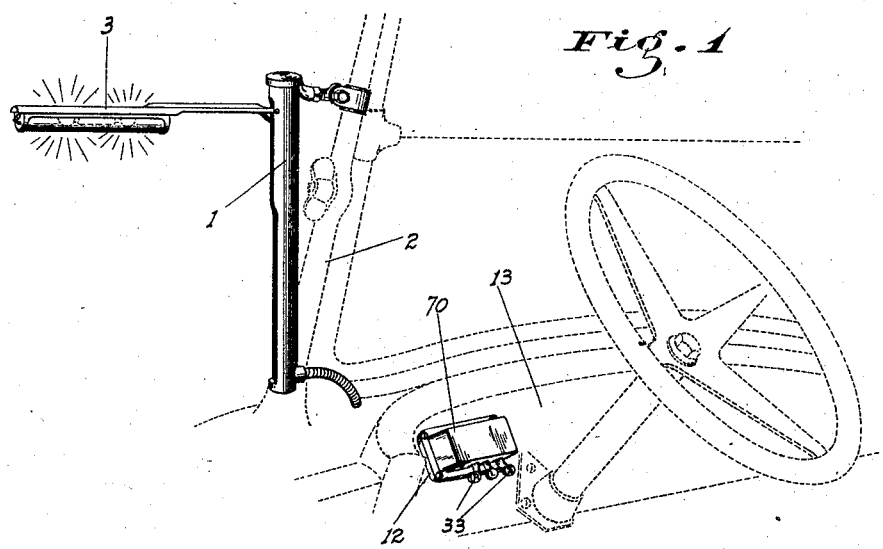
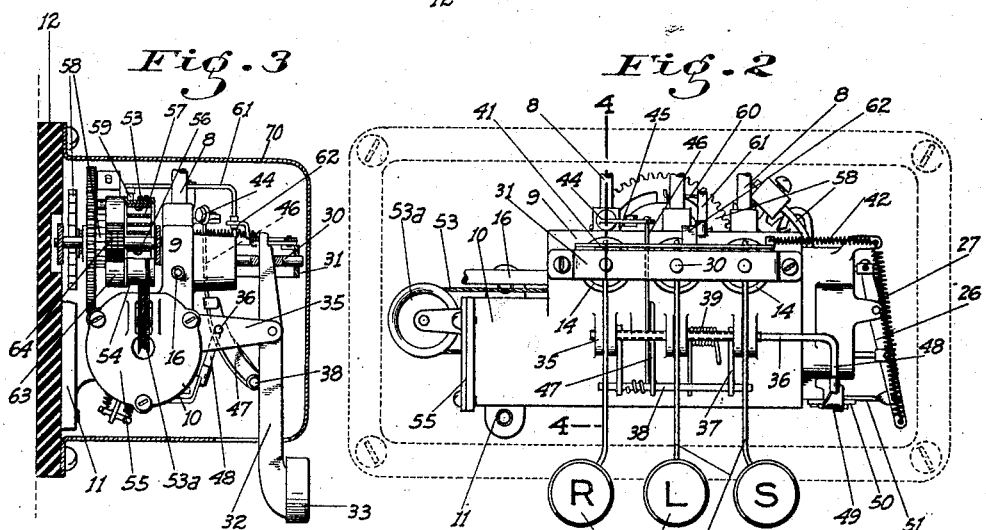
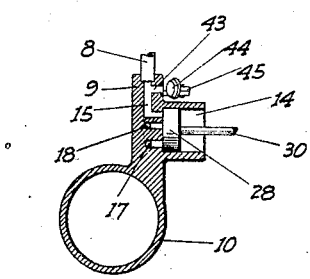
INVENTOR
*Adolph D. Willson*
BY
ATTORNEY June 29, 1926.
A. D. WILLSON
1,590,789
ACTUATING VALVE FOR VEHICLE SIGNALS
Filed Nov. 22, 1924    2 Sheets-Sheet 2
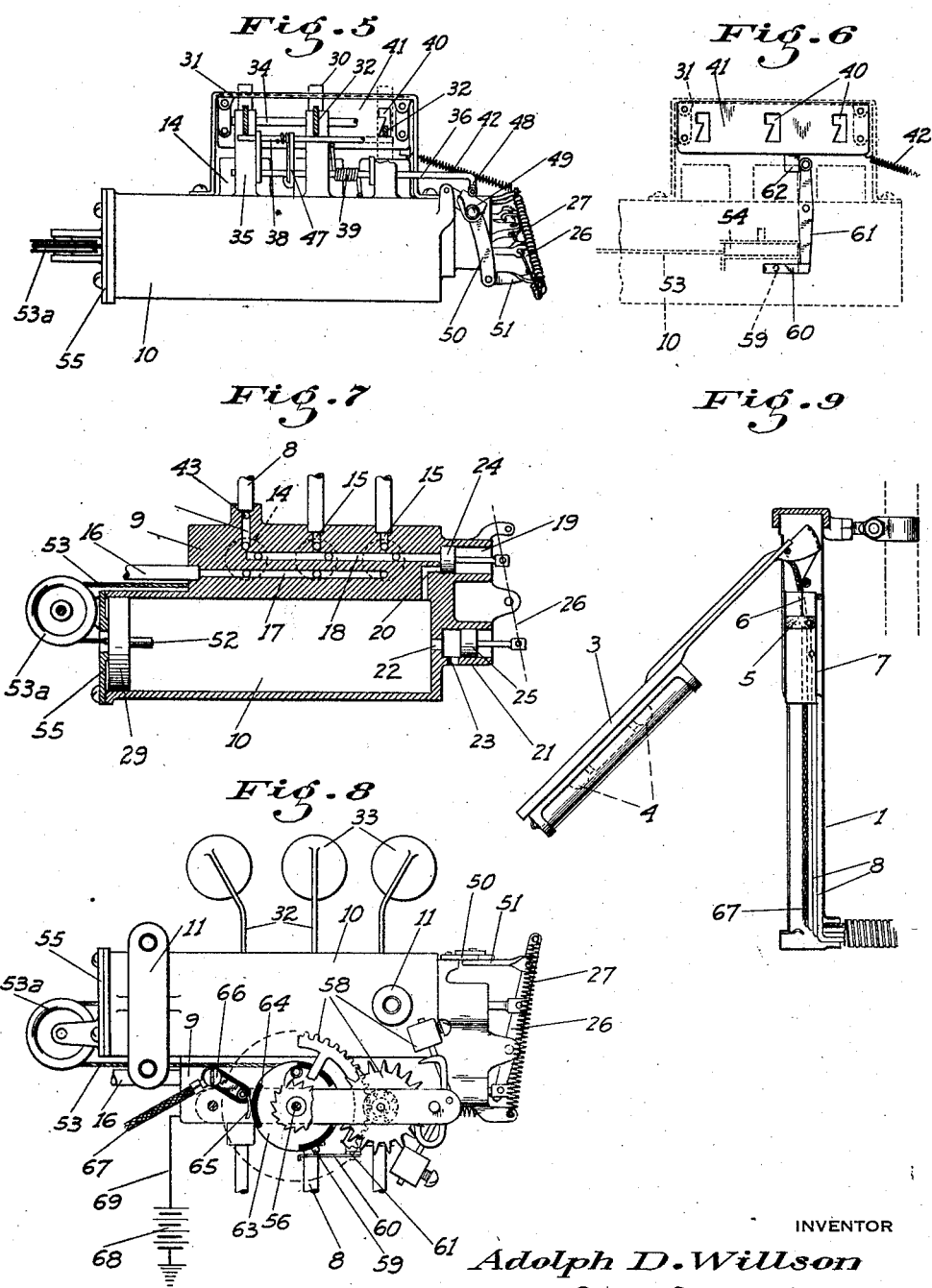
INVENTOR
Adolph D. Willson
BY
ATTORNEY

Patented June 29, 1926.

UNITED STATES PATENT OFFICE.

ADOLPH D. WILLSON, OF MODESTO, CALIFORNIA.

ACTUATING VALVE FOR VEHICLE SIGNALS.

Application filed November 22, 1924. Serial No. 751,566.

This invention relates to improvements in mechanical direction-signal devices for use on motor vehicles, and particularly to a control structure for operating and controlling the movement of a signal arm which is actuated by means of the suctional force obtainable from the intake manifold of the engine of the vehicle.

In all mechanical signals as are now on the market, as far as I am aware, whether actuated by suction or other means, the signal when raised to a certain position will either drop as soon as the operator releases the control means, or if it will hold such position when once set, must be returned to its normal or neutral position by a further actuation of the control member by the operator Such an arrangement has obvious disadvantages and defects in practice, since the signal in the one case is apt to be released too soon, and in the second case the driver is apt to forget to return the signal to normal after a turn or a stop has been made. In either case the driver is called upon to pay more attention to operating the signal than the average person can or is willing to give, and as a result very few mechanical signals are consistently and properly operated.

The principal object of my invention therefore is to provide a control means for a signal, constructed in such a manner that after the signal arm has been extended by an actuation of the control means on the part of the operator, the arm will remain thus extended for a definite period, and will then drop to its neutral position without any further attention on the part of the operator being necessary.

A further object is to provide, in connection with a signal having an arm capable of assuming a plurality of different positions, controls for each arm position for enabling the arm to be extended to any such position at the will of the operator, and an automatically acting device, common to all the controls, for causing the arm to remain extended for equal periods of time no matter what positions the arm may have been caused to assume.

These objects I accomplish by means of such structure and relative arrangement of parts as will fully appear by a perusal of the following specification and claims.

In the drawings similar characters of reference indicate corresponding parts in the several views:

Fig. 1 is a fragmentary perspective outline of an automobile, showing the signal and its control means installed thereon.

Fig. 2 is what may be considered as a top plan view of the control device.

Fig. 3 is an end view of the same.

Fig. 4 is a fragmentary cross section on line 4—4 of Fig. 2.

Fig. 5 is a front elevation of the device, with certain parts removed and others broken away.

Fig. 6 is a fragmentary front elevation, to show particularly the valve-lever holding plate and its releasing member.

Fig. 7 is a longitudinal section of the body of the device, showing the various suction passages.

Fig. 8 is a bottom plan of the apparatus.

Fig. 9 is a sectional elevation of the type of signal preferably used with my control means.

Referring now more particularly to the characters of reference on the drawings, the numeral 1 denotes a signal casing adapted to be mounted in a vertical position onto and adjacent one side of the windshield 2 of a vehicle.

Pivoted in the casing adjacent its upper end is a signal arm 3 which when in a neutral position hangs down alongside of and practically inside the casing 1. An electric light 4 is mounted on the arm 3. A piston 5, connected to the arm above its pivot by a flexible member 6, is slidable in a cylinder 7 disposed in the casing.

Independent suction pipes 8 connect with the cylinder at spaced points in the length thereof, as shown in Fig. 9.

It will therefore be seen, that if a tendency to vacuum exists in any one of the pipes, the piston 5 will be drawn down to just cover the intake opening of that pipe with the casing, will move no further down, and will remain in that position until air is admitted to the cylinder below the pipe. The points of opening of the pipes with the cylinder are of course so disposed that when the piston has moved the various distances governed by the openings, the signal arm will move to the proper signalling positions as are commonly used.

This signal structure itself forms no part of the present invention, but is shown and described in order that the use of my control device, designed especially to cooperate with such a signal may be better understood.

The control device is constructed as follows: The numeral 9 denotes a body member, with which is rigidly associated a cylinder 10. Pads 11 are mounted with this structure, which are secured onto an insulation pad 12, adapted to be mounted onto the dashboard 13 of the vehicle, or any suitable location convenient to the driver.

Mounted on the body are three valve chambers 14, one for each of the pipes 8, which lead to the body and communicate with the bottoms of the chambers by means of passages 15 as shown in Figs. 4 and 7. A suction pipe 16 is connected at one end to the body and at its other end taps the intake manifold of the engine of the vehicle (not shown). A passage 17 from the pipe 16 through the body connects individually with the bottom of each chamber 14, but has no direct connection with passages 15, as shown in Figs. 4 and 7. Another passage 18 in the body, independent of passages 15 and 17, communicates with the bottoms of all the chambers 14 and leads to the bottom of another valve chamber 19 disposed at one end of the body. A passage 20 leads from the bottom of chamber 19 to the adjacent end of cylinder 10, this end being closed while the opposite end is open to the atmosphere. Another valve chamber 21, disposed in parallel alinement with the chamber 19, is mounted outside the cylinder at the closed end thereof. A passage 22 leads from the bottom of chamber 21 to the cylinder, while a passage 23 in the side of said chamber communicates with the atmosphere.

Plungers or pistons 24 and 25 are in chambers 19 and 21 respectively, connected by a rocking arm 26 pivoted intermediate its ends onto the body 9 and arranged so that when plunger 24 is seated against the bottom of its chamber, the plunger 25 is raised from its seat and vice versa. A common form of snap-action spring 27 is used to hold the arm 26 in either position.

Plungers or pistons, one of which is shown at 28 in Fig. 4, are slidable in the valve chambers 14, and normally seat firmly against the bottoms thereof. A piston 29 is slidable in the cylinder 10 and is normally adjacent the open end thereof.

It will therefore be seen that if any plunger 28 is raised from its seat, communication will be established, inside the corresponding valve chamber, between passages 17 and 18 and the corresponding passage 15. This will cause a suctional force to be set up through the corresponding pipe 8 and pipe 16 in the direction of the latter, and the signal piston will be drawn down in its cylinder. Now if at the same time the plunger 24 is moved away from its seat and the plunger 25 consequently seated, as will be hereinafter shown, communication is established between passages 17, 18 and 20, and the suctional force thus had from cylinder 10 toward the pipe 16 causes the piston 29 to move toward the closed end of the cylinder.

These passage communications will be established regardless of which one of the plungers 28 is raised, as will be evident. The giving of a desired signal depends however upon the manipulation of the valve plunger controlling that one of the pipes 8 which is so connected to the signal cylinder 6 as to cause the signal arm to be extended to a predetermined angle as before explained.

These various valve plungers are manipulated and controlled by means of the following structure: Each plunger 28 has a stem 30 slidable through a guide plate 31 supported from the body and overhanging the chambers 14.

The stems are slotted to receive levers 32 therethrough, which on their outer ends carry finger pads of buttons 33 which are preferably marked with letters to indicate the corresponding signal-arm position had by manipulation of the buttons.

These levers are pivoted intermediate their ends, for independent rocking movement, on a shaft 34 mounted on lugs 35 projecting outwardly from the cylinder 10. It will therefore be seen that upon the depression of the buttons, the corresponding valve stem and plunger will be lifted from its seat. Journaled in the lugs 35 under the shaft 34 is another shaft 36 from which radial arms 37 project toward the outer ends of the levers 32, the outer ends of these arms being connected by a cross bar 38. This bar is constantly pressed upwardly against the levers by spring means 39, so that as a consequence the plungers 27 are normally held pressed against the bottoms of the valve chambers. When any lever is depressed, the bar 38 is also depressed and the shaft 36 is rotated.

While this operation leaves the other levers unsupported by the bar, the plungers will not lift from their seats however, since they are held closed by the atmospheric pressure on top of the same.

The ends of the levers 32 beyond the stems 30 project through vertical latch-notches 40 cut in a plate 41 suspended for limited horizontal movement from the guide plate 31, a spring 42 tending to pull the plate in one direction. The notches 40 are so shaped and disposed that when a lever is depressed at the button end, and its opposite end consequently raised, the plate 41 will be moved against the pull of the spring, without disturbing any of the other levers, until said lever reaches the top of the notch. The upper end of each notch has a lateral extension to receive the end of the corresponding levers, so that when the latter is in vertical alinement with said notch extension, the spring 42 acts to pull the plate so that the notch extension engages the lever, and the latter cannot then return to its normal position until the plate is positively moved in the opposite direction. The manner in which this is accomplished will be seen hereinafter.

Leading to the atmosphere from that one of the body passages 15 whose pipe 8 leads to the lowest point of the signal cylinder is a passage 43 (see Fig. 4) adapted to be closed by a flap-valve 44. This valve is fixed on an arm 45 which is pivoted intermediate its ends on the body. Engaging the outer end of this arm is a form of snap-action spring 46 which projects from a rigid arm 47 mounted on the bar 38 and extending across the shaft 36, being turnable on the latter.

This valve controlling device is so arranged that when the levers 32 and shaft 36 are in their normal position, the valve 44 will be open.

As soon as the bar 38 is depressed with the depression of any lever, the valve is closed, and will remain closed until the bar is raised with the raising of the lever.

It will therefore be seen that when any lever is depressed, and communication between the pipe 16 and corresponding pipe 8 is established to cause movement of the signal piston as before described, communication with the atmosphere is shut off by the closing of the passage 43 at the same time. Atmospheric communication will then be established only when the plunger controlled by the previously depressed lever returns to its normal closed position. Air then enters the pipe 8 through the passage 43, causing the negative pressure in the signal cylinder to be replaced by air at atmospheric pressure. This of course causes the piston to rise in the cylinder and the signal arm to be lowered.

Since the atmospheric passage 43 leads from that one of the pipes 8 which connects with the signal cylinder at its lowest point, it will be obvious that air will be admitted to the cylinder no matter which lever 32 has been actuated or at what position the piston may have been held in the cylinder.

The levers 32, when depressed, are held against release from the notches 41 for a predetermined period, so as to cause the signal arm to remain extended for the same period, by the following structure:

On the end of the shaft 36 nearest the arm 26 is a radial extension 48 whose outer end is adapted to engage a lug 49 flexibly mounted on an arm 50, which lies in a plane substantially at right angles to the member 26 and is normally disposed at a certain angle laterally of the path of movement of the extension 48. One end of this extension is pivoted on the cylinder 10 and the other end is connected to the arm 26 beyond the valve 25 by a link 51. (See Figs. 2 and 5.) This structure is so arranged that when the shaft 36 is turned with the depression of one of the levers 32, the arm 50 is moved so as to cause a reversal of position of the valves 24 and 25 to be had. In other words, the valve 24 will be opened and the valve 25 closed.

The lug 49 is so arranged that the extension 48 is cleared from the same when the spring 27 takes hold to complete the movement of the arm 26, and the latter may be again reversed in position without interference with the member 48 and without necessitating that the latter be returned to its normal position with such reversal of movement.

This opening of valve 24 establishes communication from suction pipe 16 to cylinder 10 through passages 17, 18 and 20. At the same time communication with the atmosphere from said cylinder is shut off by the closing of valve 25. This of course causes piston 29 to be drawn from its normal position at the outer end of the cylinder toward the head end thereof.

On the adjacent end of the piston is a pin 52 which, when said piston approaches the head end of the cylinder, projects through passage 22 and engages valve 25. This causes said valve to be displaced from its closed position, causing the passages 22 and 23 to be opened to the atmosphere and the valve 24 to be closed. Of course, as when moving the arm 26 in the reverse direction, the spring 27 takes hold and completes the movement as soon as the pin 52 has pushed the arm 26 beyond dead center.

A cable 53 is attached at one end to the outer end of the piston 29 and at the other end is attached to and wound on a drum 54 mounted on the body 9 on the opposite side thereof from the levers 32 and cooperating parts. Just outside the cylinder the cable passes over a pulley 53ª journaled onto a cap 55 secured over the outer end of the cylinder but not closing the same. This cap also serves as a stop to limit the outward movement of the piston. The drum is of such proportions relative to the travel of the piston that the former will be rotated not more than one complete revolution with any such piston movement.

The drum is supported on a fixed shaft 56, and between said drum and shaft is a spiral spring 57 arranged to be wound up when the drum rotates with the movement of the piston 29 toward the head end of the cylinder.

The speed of reverse rotation of the drum and the consequent unwinding of the spring is controlled by a suitable escapement mechanism of the type commonly used in clocks and which is indicated generally at 58.

It will therefore be seen that the drum will rotate, and the spring 57 be unwound, until the piston abuts against the cap 55.

Fixed on the drum 54 and projecting radially therefrom is a pin 59 adapted, when the spring is nearly unwound, to abut against and move an extension 60 projecting from one end of a trip lever 61 (see Figs. 3, 6 and 8).

This lever is pivoted intermediate its ends onto the body 9, and at its opposite end is adapted to engage a lug 62 on the plate 41. These parts are so arranged that when the lever 61 is moved by the pin 60, the plate 41 will be moved against the pressure of the spring 42, and whichever lever 32 is held in one of the notches 40 will be released therefrom. The spring 39 will then act on lever 32 to restore it to its normal position, causing the corresponding plunger 28 to be seated, the valve 44 to be opened, and the signal arm 2 to be lowered by reason of the conditions then obtaining as previously set forth.

It will therefore be seen that the signal arm will remain in whichever position it has been caused to assume until the escapement mechanism has allowed the unwinding of the spring to be slowly effected. The escapement mechanism may be designed to operate for any period desired, so that the signal may be caused to remain extended for the requisite length of time as governed by the traffic rules of different states.

It will also be evident that the piston 29 is moved the entire length of the cylinder, and the escapement mechanism functions for the same length of time, regardless of which lever 32 is depressed and to what position the signal arm is extended. In other words, the signal will remain extended for the same length of time regardless of whether it is moved to one position or another.

The pin 59 moves around clear of the member 60 before the drum comes to a stopping point as determined by the abutting of the piston 29 against the cap 55. (See Fig. 8.) This permits the lever 61 to resume its normal position after it has been moved to cause the plate 41 to move, also of course permitting said plate to resume its normal position. The member 60 is flexible in one direction, so as to allow the pin 59 to pass under and past the same without imparting any movement to the lever when the drum is rotated in the opposite direction with the winding up of the spring.

To cause the lights in the signal arm to alternately flash on and off as long as the arm is extended, I employ the following structure;

Arranged in fixed relation with the drum is a commutator disc 63 having spaced peripheral segments 64 of insulation material (see Fig. 8). The periphery of this disc is constantly engaged by a brush 65 connected by suitable binding post means 66 to the wire 67 which leads direct to the lights.

The post and brush are insulated from the body while the latter, and consequently the disc 63, is directly connected to a source of current 68 (such as the usual car battery) by a lead 69. The battery is grounded as is customary, and the lights are also grounded, so that a circuit is closed through the lights whenever the brush 65 contacts with the disc itself, and broken when said brush passes over one of the segments 64. The latter are arranged so that the brush is always in contact with one of the segments whenever the disc comes to a stop with the unwinding of the spring in the drum.

This stopping place will always be the same, owing the the cap 55 which forms a stop for the movement of the piston 29, whose movement in turn controls the rotation of the drum and commutator disc.

A casing 70, secured to the base 12, encloses the entire structure with the exception of the buttons 33, which project therefrom as shown.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In combination with a signal having a cylinder, a piston movable therein and a signal arm operatively connected to the piston and moving therewith; fluid pressure means for operating the piston, valve means for controlling the flow of the fluid, and means arranged in connection with the valve means whereby when the latter is actuated to cause the piston to move, the latter will remain in a certain position for a predetermined period.

2. In combination with a signal having a cylinder, a piston movable therein and a signal arm operatively connected to the piston and moving therewith; a plurality of fluid pipes connecting with the cylinder at different points in its length, individual valves controlling the flow of fluid through the pipes, and a common means controlled by the initial actuation of any valve for causing the piston to remain for a predetermined period at that point in the cylinder to which it is moved as determined by the pipe whose valve is actuated.

3. A valve structure for use in connection with a signal having a cylinder, a piston movable therein, a signal arm operatively connected to the piston and moving therewith, comprising a body, a plurality of independent pipes leading therefrom to the cylinder, a pipe leading to the body, individual passage means between said last and first named pipes, individual and independently operated valves interposed in said passage means, an exhaust passage leading from one of the first named pipes, a valve for said exhaust passage, and means whereby when said first named valves are closed the exhaust valve will be automatically opened, and when any one of said first named valves is opened the exhaust valve will be automatically closed.

4. In combination with a signal having a cylinder, a piston movable therein and a signal arm operatively connected to the piston and moving therewith; a plurality of fluid pipes connecting with the cylinder at different points in its length, individual valves controlling the flow of fluid through the pipes, an exhaust passage leading from that one of the pipes which connects with the cylinder nearest the end thereof, a valve for said exhaust passage, and means whereby when said first named valves are closed the exhaust valve will be open and when any one of the first named valves is opened the exhaust valve will be closed.

5. A valve structure for use in connection with a signal having a cylinder, a piston movable therein, a signal arm operatively connected to the piston and moving therewith, comprising a body, a plurality of independent pipes leading therefrom to the cylinder, a pipe leading to the body, individual passage means between said last and first named pipes, individual and independently operated valves interposed in said passage means, and a means common to all the valves whereby when any one of the same is opened it will remain open for a predetermined period and will then automatically close.

6. A valve structure for use in connection with a signal having a cylinder, a piston movable therein, a signal arm operatively connected to the piston and moving therewith, comprising a body, a plurality of independent pipes leading therefrom to the cylinder, a pipe leading to the body, individual passage means between said last and first named pipes, individual and independently operated valves interposed in said passage means, and a means common to all the valves and caused to function by the opening movement of any valve for causing the latter to remain open for a predetermined period and to then automatically close.

7. In combination with a signal having a cylinder, a piston movable therein, a signal arm operatively connected to the piston and moving therewith, passage means leading from the cylinder, a valve interposed in said passage means, and a means initially controlled by the opening movement of the valve, for causing the same to remain open for a predetermined period and to then automatically close 8. In combination with a signal having a cylinder, a piston movable therein, a signal arm operatively connected to the piston and moving therewith, passage means leading from the cylinder, a valve interposed in said passage means, an operating member for said valve, a catch with which the member engages when the latter is moved to open the valve, and means whereby the catch will only be released to permit the valve to close after the valve has been opened a predetermined period.

9. In combination with a signal having a cylinder, a piston movable therein, a signal arm operatively connected to the piston and moving therewith, passage means leading from the cylinder, a valve interposed in said passage means, an operating member for said valve, a catch with which the member engages when the latter is moved to open the valve, and means caused to be actuated by the opening movement of the valve operating member for causing the catch to be automatically released only after the valve has been opened a predetermined period.

10. In combination with a signal having a cylinder, a piston movable therein, a signal arm operatively connected to the piston and moving therewith, passage means leading from the cylinder, a valve interposed in said passage means, an operating member for said valve, a catch with which the member engages when the latter is moved to open the valve, a trip member for releasing the catch, and means whereby the trip will not be actuated until after the valve has been open for a predetermined period.

11. A valve structure for use in connection with a signal having a cylinder, a piston movable therein, a signal arm operatively connected to the piston and moving therewith, comprising a body, a plurality of independent pipes leading therefrom to the cylinder, a pipe leading to the body, individual passage means between said last and first named pipes, individual and independently operated valves interposed in said passage means, individual operating members for all the valves, a catch means common to all the members and with which any of the members engages when the same is moved to open the valve, and without disturbing the other members, and means caused to be actuated by the opening movement of any such valve control member for causing the catch member to be released only after the corresponding valve has been opened for a predetermined period.

12. In combination with a signal having a cylinder, a piston movable therein, a signal arm operatively connected to the piston and moving therewith, passage means leading from the cylinder, a valve interposed in said passage means, an operating member for said valve, a catch with which the member engages when the latter is moved to open the valve, a trip member for releasing the catch, a spring-actuated escapement mechanism, means between the trip and said mechanism for causing the trip to be actuated only after a predetermined period of operation of said mechanism, and means controlled by the opening movement of the valve operating member for setting the mechanism in operation.

13. In combination with a signal having a cylinder, a piston movable therein, a signal arm operatively connected to the piston and moving therewith, passage means leading from the cylinder, a valve interposed in said passage means, an operating member for said valve, a catch with which the member engages when the latter is moved to open the valve, a trip member for releasing the catch, an escapement mechanism including a drum, and a spiral spring wound up upon the rotation of said drum in one direction, said escapement mechanism controlling the unwinding of the spring, means between the trip and said mechanism for causing the trip to be actuated only when the spring is about unwound, and means caused to be actuated by the opening movement of the valve operating member for rotating the drum and for winding the spring.

14. In combination with a signal having a cylinder, a piston movable therein, a signal arm operatively connected to the piston and moving therewith, passage means leading from the cylinder, a valve interposed in said passage means, an operating member for said valve, a catch with which the member engages when the latter is moved to open the valve, catch means then acting to prevent closing movement of the valve, an escapement mechanism including a drum, and a spiral spring wound up with the rotation of the drum in one direction, the escapement mechanism controlling the unwinding of the spring; means between said mechanism and the catch means for causing the latter to be released only when the spring is about unwound, and means for causing a winding up of the spring to take place when the valve operating member is moved to open the valve.

15. In combination with a signal having a cylinder, a piston movable therein, a signal arm operatively connected to the piston and moving therewith, passage means leading from the cylinder, a valve interposed in said passage means, an operating member for said valve, a catch with which the member engages when the latter is moved to open the valve, catch means then acting to prevent closing movement of the valve, an escapement mechanism including a drum, and a spiral spring wound up with the rotation of the drum in one direction, the escapement mechanism controlling the unwinding of the spring; means between said mechanism and the catch means for causing the latter to be released only when the spring is about unwound, a cylinder, a piston therein, a cable from the piston wound about the drum, and means whereby the piston will travel in the cylinder a predetermined distance to cause the spring to be wound up when the valve is opened.

16. In combination with a signal having a cylinder, a piston movable therein, a signal arm operatively connected to the piston and moving therewith, passage means leading from the cylinder, a valve interposed in said passage means, an operating member for said valve, a catch with which the member engages when the latter is moved to open the valve, catch means then acting to prevent closing movement of the valve, an escapement mechanism including a drum, and a spiral spring wound up with the rotation of the drum in one direction, the escapement mechanism controlling the unwinding of the spring; means between said mechanism and the catch means for causing the latter to be released only when the spring is about unwound, a cylinder, a piston therein, a cable from the piston wound about the drum, passage means between the cylinder and first named passage means, a valve in said cylinder passage means, and means between said last named valve and the other valve operating member for causing the last named valve to be opened when the first named valve is opened, whereby pressure may be introduced into the cylinder to cause the piston therein to travel lengthwise of said cylinder and cause the drum to be rotated to wind the spring.

17. In combination with a signal having a cylinder, a piston movable therein, a signal arm operatively connected to the piston and moving therewith, passage means leading from the cylinder, a valve interposed in said passage means, an operating member for said valve, a catch with which the member engages when the latter is moved to open the valve, catch means then acting to prevent closing movement of the valve, an escapement mechanism including a drum, a spiral spring wound up with the rotation of the drum in one direction, the escapement mechanism controlling the unwinding of the spring; means between said mechanism and the catch means for causing the latter to be released only when the spring is about unwound, a cylinder, a piston therein, a cable from the piston wound about the drum, passage means between the cylinder and first named passage means, a valve in said cylinder passage means, means between said last named valve and the other valve operating member for causing the last named valve to be opened when the first named valve is opened, whereby pressure may be introduced into the cylinder to cause the piston therein to travel lengthwise of said cylinder and cause the drum to be rotated to wind the spring, an exhaust passage from said cylinder, a valve for said exhaust passage, means between the exhaust valve and the other cylinder valve for causing the one to be opened when the other is closed and vice versa, and means whereby the exhaust valve will be opened and the other valve closed after the piston has moved a predetermined distance in the cylinder.

18. In combination with a signal having a cylinder, a piston movable therein, a signal arm operatively connected to the piston and moving therewith, passage means leading from the cylinder, a valve interposed in said passage means, an operating member for said valve, a catch with which the member engages when the latter is moved to open the valve, catch means then acting to prevent closing movement of the valve, an escapement mechanism including a drum, a spiral spring wound up with the rotation of the drum in one direction, the escapement mechanism controlling the unwinding of the spring; means between said mechanism and the catch means for causing the latter to be released only when the spring is about unwound, a cylinder, a piston therein, a cable from the piston wound about the drum, passage means between the cylinder and first named passage means, a valve in said cylinder passage means, means between said last named valve and the other valve operating member for causing the last named valve to be opened when the first named valve is opened, whereby pressure may be introduced into the cylinder to cause the piston therein to travel lengthwise of said cylinder and cause the drum to be rotated to wind the spring, an exhaust passage from said cylinder, a valve for said exhaust passage, means between the exhaust valve and the other cylinder valve for causing the one to be opened when the other is closed and vice versa, and means for causing the exhaust valve to be opened by the piston when the latter has moved lengthwise a predetermined distance in the cylinder.

In testimony whereof I affix my signature.

ADOLPH D. WILLSON.